March 26, 1957   W. B. CLARKE ET AL   2,786,564
TRANSFER APPARATUS

Original Filed Dec. 7, 1954   5 Sheets-Sheet 1

INVENTORS.
William B. Clarke
Anthony J. Baldassare
Joseph Yut
BY Webb, Mackey & Burden
THEIR ATTORNEYS March 26, 1957   W. B. CLARKE ET AL   2,786,564
TRANSFER APPARATUS Original Filed Dec. 7, 1954   5 Sheets-Sheet 2

INVENTORS.
William B. Clarke
Anthony J. Baldassare
Joseph Yut
BY
Webb, Mackey & Burden
THEIR ATTORNEYS INVENTORS.
William B. Clarke
Anthony J. Baldassare
Joseph Yut
BY
Webb, Mackey & Burden
THEIR ATTORNEYS March 26, 1957 W. B. CLARKE ET AL 2,786,564
TRANSFER APPARATUS
Original Filed Dec. 7, 1954 5 Sheets-Sheet 4

INVENTORS.
William B. Clarke
Anthony J. Baldassare
Joseph Yut
BY
Webb, Mackey & Burden
THEIR ATTORNEYS

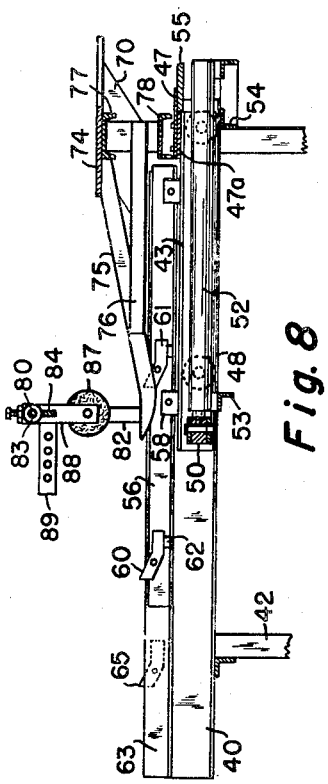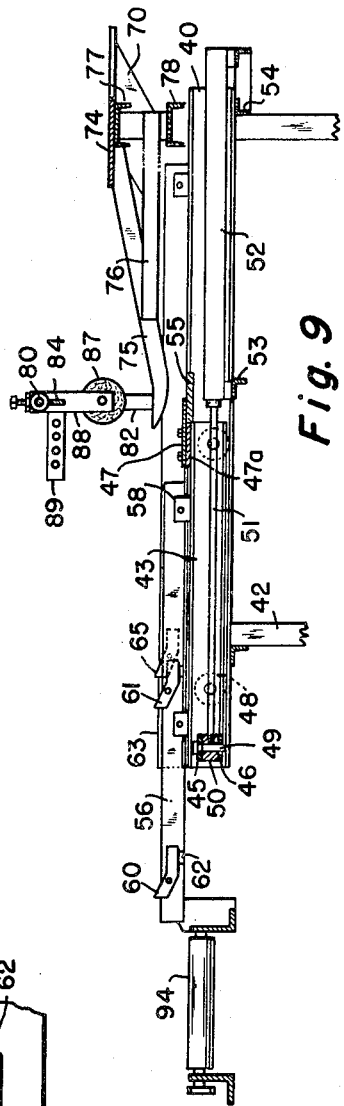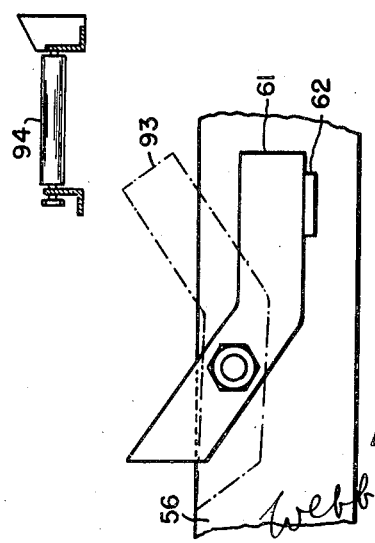

United States Patent Office 2,786,564
Patented Mar. 26, 1957

2,786,564

TRANSFER APPARATUS

William B. Clark, Sewickley, and Anthony J. Baldassare and Joseph Yut, Coraopolis, Pa., assignors to Rockwell Spring & Axle Company, Coraopolis, Pa., a corporation of Pennsylvania Original application December 7, 1954, Serial No. 473,602. Divided and this application April 4, 1956, Serial No. 576,093

6 Claims. (Cl. 198—24)

This invention relates to transfer apparatus and, more particularly, to turntable apparatus designed to release an article or workpiece from a work station and then automatically transfer the article to still another station. This application is a division of Clarke et al. application, Serial No. 473,602, filed December 7, 1954.

In processing various articles, it is often necessary to handle them one at a time, especially when an operation is to be performed on each individually. As an instance, bumpers for automobiles are individually buffed to impart a glossy finish. To accomplish this, it is necessary to position a bumper on a buffing table, later remove the bumper after buffing, and then place the bumper on an additional conveyor or similar means to carry the bumper to still another point.

Heretofore, such processing of bumpers one at a time has been largely dependent on manual labor. Our invention provides automatic equipment for processing an article such as a bumper through substantially all the indicated steps. While our apparatus is disclosed in connection with transferring a bumper from a buffing table to a conveyor, it will be apparent that our apparatus is not limited thereto but generally adapted to transferring automatically an article or work-piece from one station to another.

The accompanying drawings illustrate a presently preferred embodiment wherein:

Figure 8 is a section of Figure 7 on the line VIII—VIII and illustrates the carriage in a more retracted position;

Figure 9 is a section similar to Figure 8 and shows the carriage in a forward position; and Figure 10 is an enlarged view of a lug used on the carriage and illustrates a stop that limits rearward pivoting of the lug.

Figure 1:
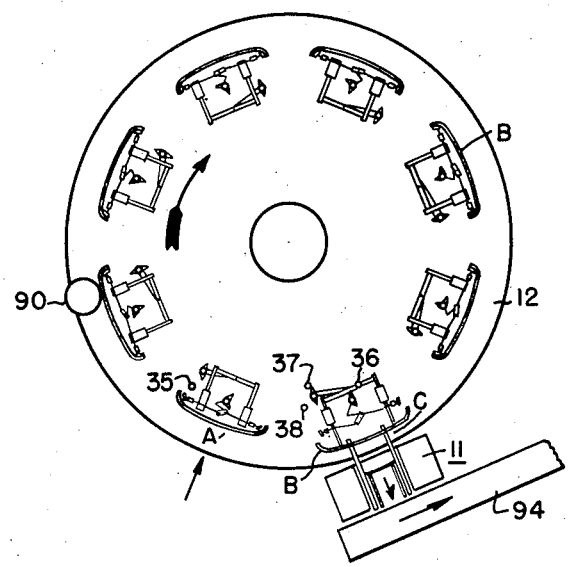
Figure 1 is a plan view of a rotary buffing table embodying our invention.

In the embodiment illustrated, our transfer apparatus generally shown at 11 (Figure 1) is adapted for use with a rotary buffing table 12 for automobile bumpers. The table has an entry position A and an exit position C for the bumpers. There are a number of stations along the periphery of the table where a bumper is locked in place by the apparatus shown in Figure 2. This apparatus includes a stud 13 fixed to the table 12 having a loosely fitting sleeve 14 provided with cams 15 and 16. A link 17 pivotally connects a fixed finger 18 on the sleeve to a bar 19 which pivots about a stub shaft 20. At each end of the bar 19 there is a pitman 21 which pivotally joins a link 22. Each link is adapted for lengthwise movement in a sleeve 23 and terminates in a shoe 24 adapted to engage an end of a bumper B.

Each station on the rotary table also has ejection means including a pair of rams 25 and 26 adapted for lengthwise movement in guiding sleeves 27 and 28, respectively, which pass beneath the pitmans 21 and links 22. A cross bar 29 joins the rams. A stud 30 fixed to the table 12 has a loosely fitting sleeve 31 similar in construction to stud 13 and sleeve 14. At the top of the sleeve 31, there are fixed cams 32 and 33, and at the bottom of the sleeve there is a pitman 34 pivotally connecting to the cross bar 29. At the entry position A there is also a fixed roller 35 supported from above the table, and at the exit position C there are three of such rollers 36, 37, and 38.

In Figures 6 through 10, a carriage 39 rides upon a pair of side channel beams 40 and 41 forming part of a general framework carried by legs 42. The carriage comprises angle beams 43 and 44 joined at the front by bars 45 and 46 and at the rear by bar 47 fixed to a spacer 47a. Rollers 48 journaled for rotation in the beams 43 and 44 ride in the channel beams 40 and 41. A pin 49 connects bars 45 and 46 and has a collar 50 disposed between the bars to which a piston rod 51 of a double-acting air cylinder 52 is connected. Angle beams 53 and 54 support the cylinder. Bar 47 has a bumper strip 55, adjustably positioned thereon, to space the carriage at a desired retracted position with respect to the round table. Arms 56 and 57 are fixed to angle clips 58 and 59 held by the angle beams 43 and 44, respectively. Each arm has a forward lug 60 and a rearward lug 61. Each lug is free to pivot forwardly, but as illustrated in Figure 10 for lugs 61, a stop 62 limits rearward pivoting toward which the lugs are fulcrumed normally to turn. Stationary plates 63 and 64, supported by the framework adjacent the sides of the carriage, have pivoted lugs 65 and 66, respectively. These latter lugs are subsequently referred to simply as "stationary lugs" to distinguish them from lugs 60 and 61 which move with the carriage 39. However, it is understood that lugs 65 and 66 are free to pivot forwardly like the other lugs and have a stop similar to stop 62 to limit rearward pivoting.

Aprons 67 and 68 are suitably supported on each side of the carriage 39 on extensions 69 from the framework. Skids 70 and 71 connect the aprons to slide plates 72 and 73 which with a middle slide plate 74 are about on the level of the roller table 12. Slide plate 74 also has runners 75 held by braces 76 and is supported over channel beams 77 and 78. Beam 78 has a suitable opening 79 to pass the bumper strip 55.

A rod 80 extends across the carriage and is supported adjacent its ends in fixed sleeve 81 carried on standards 82. The latter, in turn, are supported along the edges of the aprons 67 and 68. Sleeves 83 are free to pivot about the rod 80 and jointly carry a bar 84. End sleeves 85 and lock bolts 86 hold the bar 84 in a desired position on the rod 80. Cloth-covered rollers 87 are journaled in strips 88 which depend from the bar 84. Bar 84 has a counterweight 89.

Figure 2:
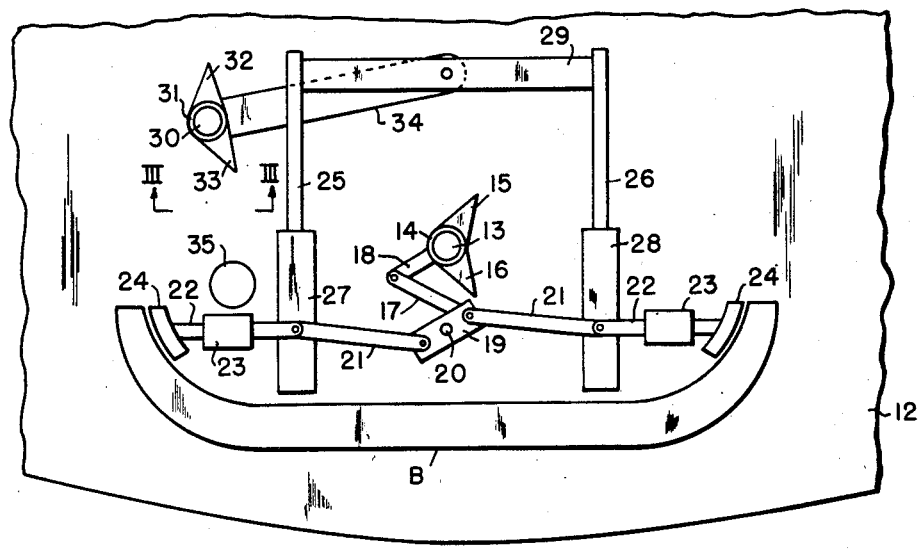
Figure 2 is an enlarged plan view of apparatus on the rotary table for locking a bumper in place and shows the relation of the parts of such apparatus at an entry position of the table.
Figure 3:
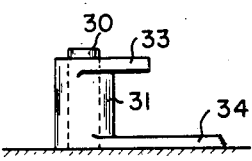
Figure 3 is a partial section of Figure 2 on the line III—III.
Figure 4:
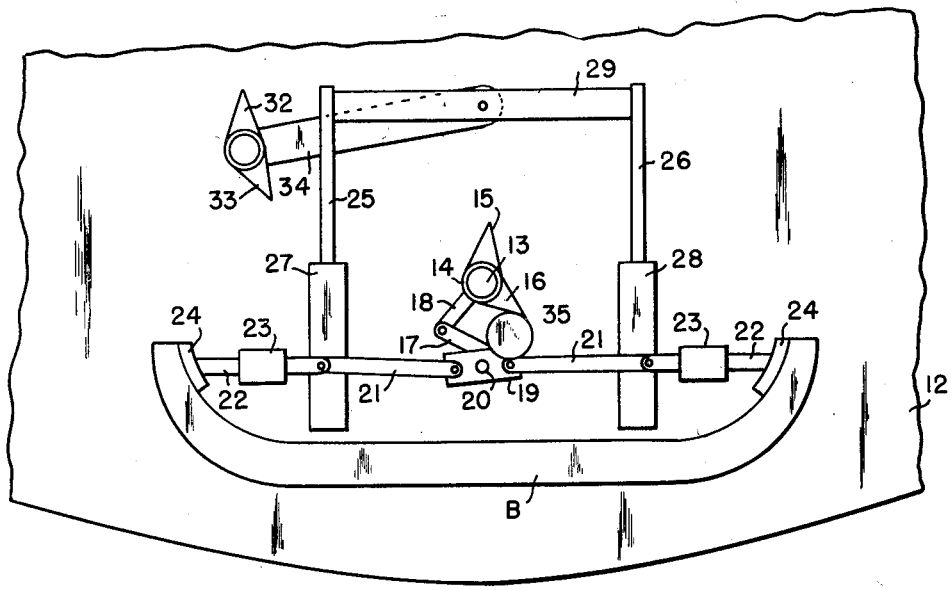
Figure 4 is a view similar to Figure 2 and illustrates the locking apparatus being closed.
Figure 5:
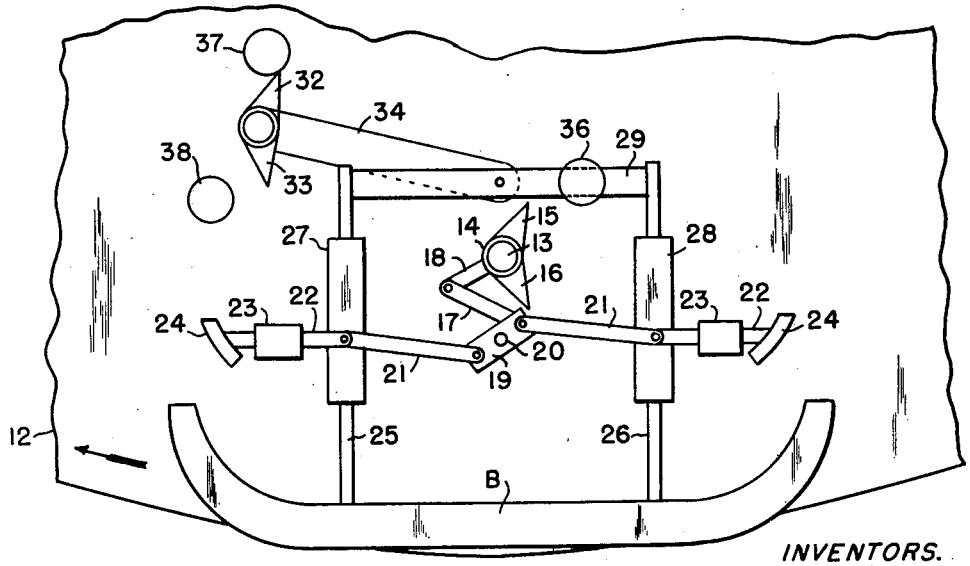
Figure 5 is another enlarged plan view of the apparatus of Figure 2 and shows the relation of the parts of such apparatus at the exit position of the table.
Figure 6:
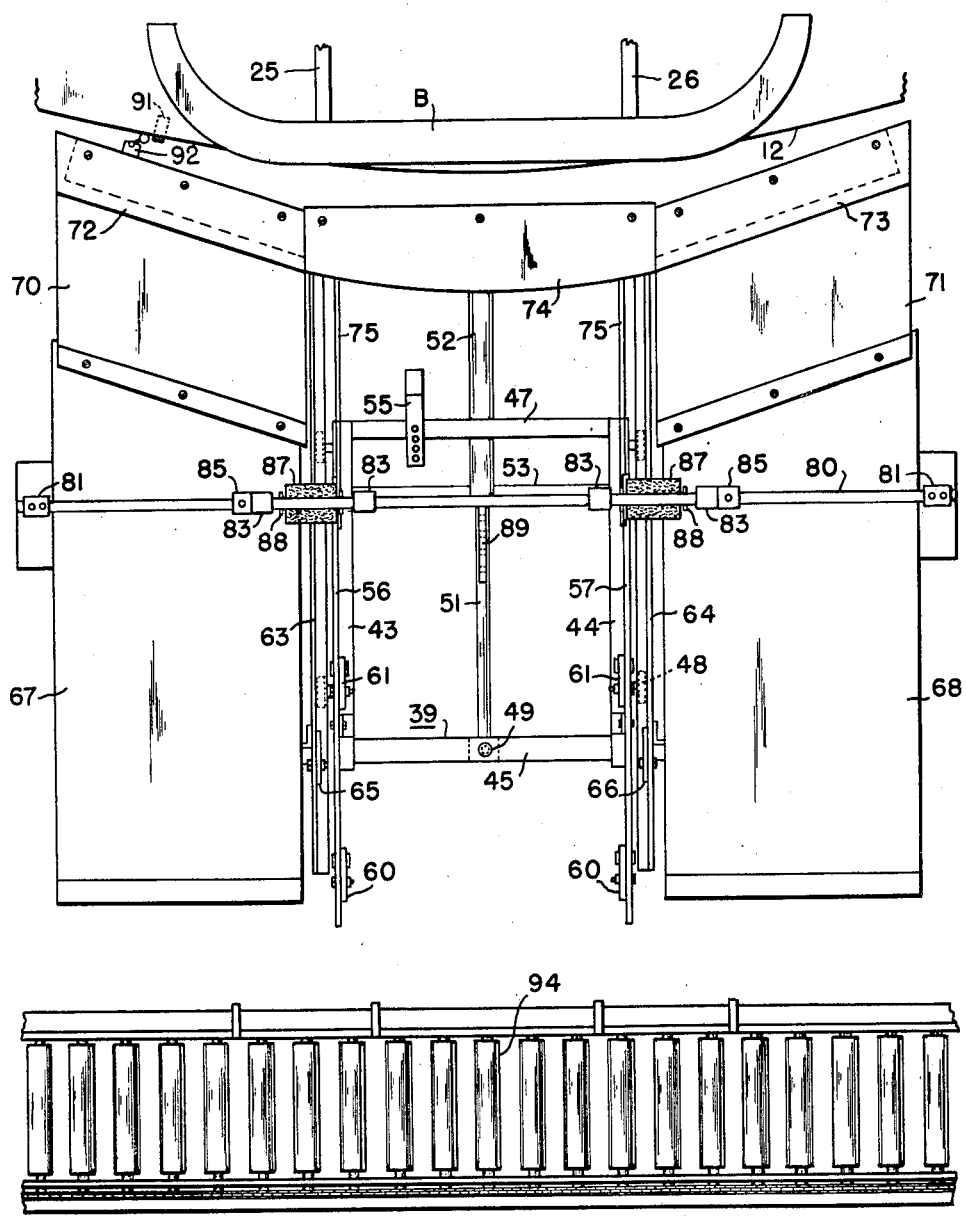
Figure 6 is a plan view of apparatus for automatically transferring a bumper from the table of Figure 1 to another station.
Figure 7:
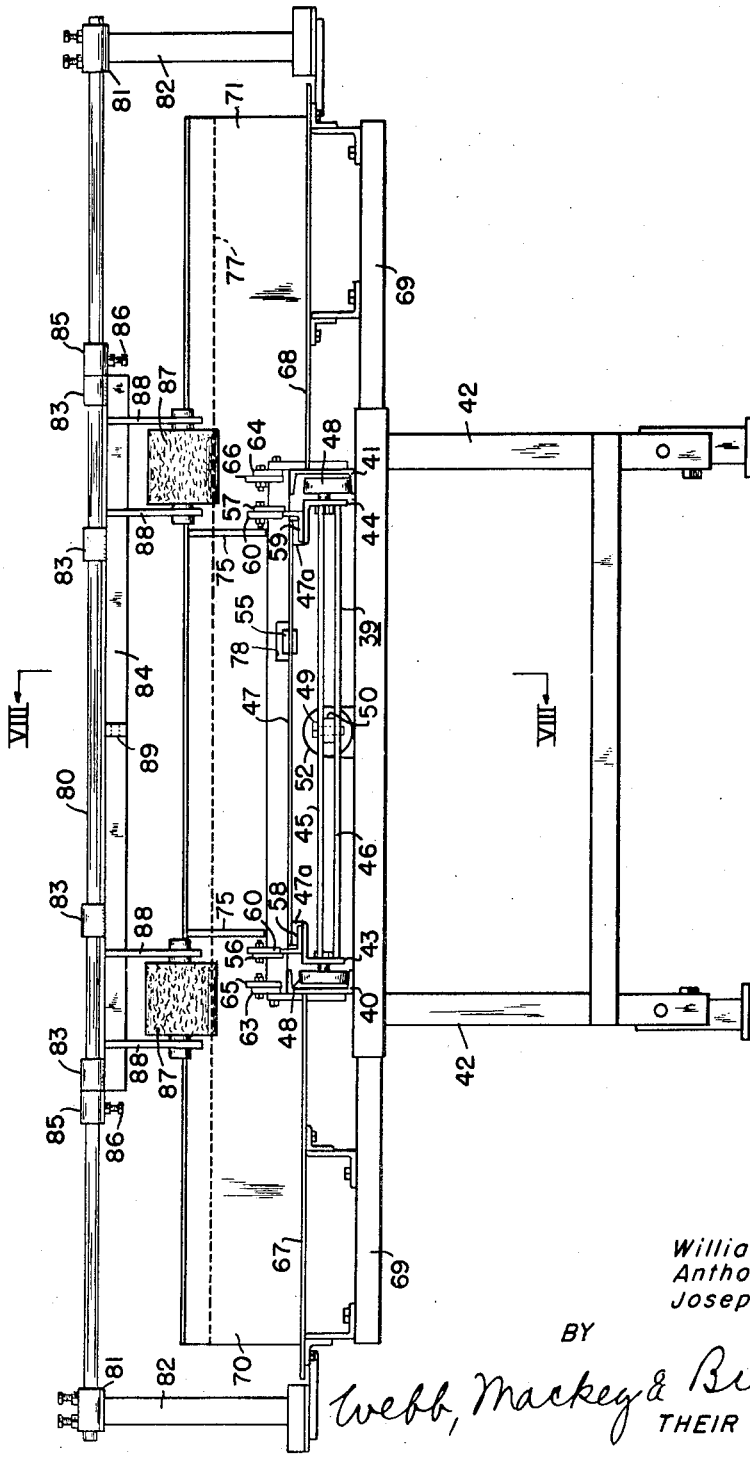
Figure 7 is a front view of Figure 6.

In operation, a bumper is placed on the rotary table 12 at the entry position A from a feed-in conveyor as shown in Figure 1. The table continuously turns in a clockwise direction so that roller 35 shortly thereafter strikes cam 16 and through the described linkages (Figure 4) thrusts the shoes 24 against the ends of the bumper B, thereby locking it in place. As the table turns, one or more buffing wheels 90 buff the face of the bumper. At the exit position C (Figure 5), roller 36 strikes cam 15 to retract the shoes 24 from the bumper. Roller 37 then strikes cam 32 to push the rams 25 and 26 forward and eject the bumper B from the table. Almost immediately thereafter, roller 38 strikes cam 33 to retract the rams to their original positions, and the operation on the table 12 as described is repeated.

The bumper slides over plates 72, 73, and 74 and down the skids 70 and 71 and runners 75, so that the ends of the bumper come to rest on the aprons 67 and 68 with the central portion of the bumper extending across the carriage 39 and between the forward lugs 60 and the rearward lugs 61. The cloth-covered rollers 87 ease the bumper into this position and also tend to swing the bumper to the described transverse position across the carriage should the bumper descend down the skids in a skewed fashion. The double-acting cylinder 52 may be manually operated or automatically actuated in response to the movement of the bumper or in response to lugs 91 on the rotary table striking a fixed limit switch 92.

On actuation of the cylinder 52 for causing the first forward movement of the carriage 39, the rearward lugs 61 catch the bumper and, because of their limited rearward pivoting, carry the bumper forwardly past the stationary lugs 65 and 66 so that the lugs are related as shown in Figure 9. On the second forward movement of the carriage, which can be preceded by receipt of a second bumper onto the carriage, the forward carriage lugs 60 catch the first bumper and carry it away from the stationary lugs 65 and 66 to deposit the bumper on a run-out conveyor 94 which carries it to still another station.

While the foregoing disclosure describes a presently preferred embodiment, it is understood that the invention may be practiced in other forms within the scope of the following claims.

We claim:

1. Apparatus including a conveyor adapted to carry an article, shoe locking means slidably related to the conveyor for conjoint movement in opposite directions to spread against and grip the article in place on the conveyor, ram means to eject the article from the conveyor, and separate means independently responsive to a predetermined position of the conveyor to withdraw the locking means and to operate the ram means.

2. Apparatus including a conveyor adapted to carry an article thereon, a coaxial pair of spaced apart guide sleeves fixed to the conveyor, shoe locking means shiftably mounted for conjoint outward movement in opposite directions in the guide sleeves to engage the article and hold it in place on the conveyor, cam means to lock the shoe means against the article, cam means to unlock the shoe means, spaced apart guide sleeves each fixed to the conveyor at a location adjacent said coaxial sleeves but in a disposition transverse to their common axis, rams shiftably mounted for conjoint parallel movement in the transverse sleeves to engage and eject the article from the conveyor, and means fixed with respect to the conveyor to actuate the cam and ejector means at predetermined positions of the conveyor.

3. Apparatus for transferring articles including a conveyor to carry a plurality of the articles and having an entry position and an exit position therefor, a coaxial pair of spaced apart guide sleeves fixed to the conveyor, shoe locking means shiftably mounted for conjoint outward movement in opposite directions in the guide sleeves to engage each article and hold it in place on the conveyor, cam means to lock the shoe means against the article, cam means to unlock the shoe means, spaced apart guide sleeves each fixed to the conveyor at a location adjacent said coaxial sleeves but in a disposition transverse to their common axis, rams shiftably mounted for conjoint parallel movement in the transverse sleeves to engage and eject each article from the conveyor, means fixed with respect to the conveyor adjacent the entry position to operate the shoe locking means, and means fixed with respect to the conveyor adjacent the exit position to unlock the shoe means and operate the ram means.

4. A turn table having two upstanding stud members disposed in spaced apart relationship at fixed locations thereon, a set of parallel ram members which are connected together and mounted in the vicinity of the stud locations to reciprocate with respect to the fixed stud members, a set of aligned thrust members disposed transversely to the ram members and having shoes at the ends which they reciprocate in opposite directions, a group of at least two vertical sleeves with one received on each stud member and each sleeve being operatively connected to a different set of the aforesaid sets of members from the other sleeve, a group of horizontal guide sleeves fixed at points on the table and receiving the individual members of the sets of thrust members and ram members, and cams connected to the vertical sleeves and engageable with stationary means during turning of the table to advance and retract the ram members and to extend and later foreshorten the shoe thrust members in that sequence for controlling articles on the table, the sleeves constituting one of said horizontal and vertical groups having loose fits with their associated members therein for accommodation of the aforesaid sequence of movement.

5. A turn table having two upstanding stud members which are spaced apart at fixed locations thereon, a set of parallel ram members which are connected together and mounted in the vicinity of the stud locations to reciprocate with respect to the fixed stud members, a set of aligned thrust link members disposed transversely to the ram members and having shoes at the ends which they reciprocate in opposite directions, a group of at least two vertical sleeves with one received on each stud member and each sleeve being operatively connected to a different set of the aforesaid sets of members from the other sleeve, a group of horizontal guide sleeves fixed at points on the table and receiving the individual members of the sets of thrust link and ram members, and cams connected to the vertical sleeves and engageable with stationary means during turning of the table to advance and retract the ram members and to extend and later foreshorten the shoe link members in that sequence for controlling articles on the table, each of the vertical sleeves having a bind-free loose fit with the stud member associated therewith.

6. A conveyor having means thereon to grip bumpers to be processed and like articles of general bow-shape between their opposite end sections, comprising a coaxial pair of spaced apart guide means fixed to the conveyor, extensible links having means to simultaneously spread them at their inner ends and being slidably related to said guide means so as to simultaneously move axially with respect thereto in opposite directions, said links having shoes at their outer ends complemental to the end sections of an article to be processed and connected for movement with the links to spread and grip said end sections and being retractable by the links after the processing of the article, and ram means moving in a transverse path between the shoes when they retract so as to eject the processed article.

References Cited in the file of this patent

UNITED STATES PATENTS 2,443,293    Bergstein et al. _____ June 15, 1948